United States Patent [19]

Kawano et al.

[11] 4,316,583
[45] Feb. 23, 1982

[54] DEMOLITION AGENT FOR BRITTLE MATERIALS

[75] Inventors: Toshio Kawano, Ichihara; Shiro Ishii, Zushi, both of Japan

[73] Assignee: Onoda Cement Company, Ltd., Onoda, Japan

[21] Appl. No.: 131,537

[22] Filed: Mar. 18, 1980

[30] Foreign Application Priority Data

Mar. 20, 1979 [JP] Japan .................................. 54-31763

[51] Int. Cl.³ .............................................. B02C 19/00
[52] U.S. Cl. .......................................... 241/1; 106/89; 106/90; 106/109; 106/118
[58] Field of Search ................... 106/89, 90, 109, 118; 241/1, 30

[56] References Cited

U.S. PATENT DOCUMENTS 3,947,228  3/1976  Kawano et al. .................. 106/89
3,959,004  5/1976  Stryker ............................... 106/89

FOREIGN PATENT DOCUMENTS 624893  9/1978  U.S.S.R.

OTHER PUBLICATIONS

Jon et al., Sement Gijutsu Nempo, 1977, 31, pp. 66-70, Japan.
Takeshi et al., Japan Kokai Tokkyo Koho, 79-43,935, Application 77-109,944.
Yoshio, Concrete Journal, vol. 11, No. 1, 1973, pp. 39-49, Japan.

*Primary Examiner*—James Poer
*Attorney, Agent, or Firm*—Oblon, Fisher, Spivak, McClelland & Maier

[57] ABSTRACT

The present demolition agent for brittle materials is prepared by pulverizing a clinker which is obtained by mixing a calcareous material, a siliceous material and gypsum at the molar ratio of $CaO/SiO_2 = 5.0$-$14.4$ and $CaSO_4/SiO_2 = 0.13$-$1.19$ and burning the mixture under an oxidizing atmosphere to 1350°–1550° C. The main components of the clinker thus obtained consist of 24–65% by weight of $3CaO \cdot SiO_2$ crystals, 30–60% by weight of CaO crystalline particles and 5–17% by weight of $CaSO_4$, wherein more than 50% by weight of said CaO crystalline particles is included in the large $3CaO \cdot SiO_2$ crystals grown.

The present demolition agent is used to break brittle materials by means of the expansive stress of aqueous slurry of the demolition agent poured into the hole of the brittle materials.

6 Claims, 5 Drawing Figures

DEMOLITION AGENT FOR BRITTLE MATERIALS

BACKGROUND OF THE INVENTION

This invention relates to a demolition agent for brittle materials such as concrete, rocks and bricks etc.

Hitherto, many demolition agents such as explosives, expansion gases and expansion materials have been proposed for brittle materials such as concrete, rocks and bricks etc. Among those, the explosives are a preferable demolition agent because of its strong breakage effect per unit time, but it has disadvantages that it may cause pollution such as noise, flyrock, vibration, dust and the like at an explosion time and that there may be accompanied with a danger during its operation. In order to eliminate such disadvantages, it has been proposed a method wherein a slurry of expansion material is filled into a hole drilled in a brittle material to demolish it by means of the expansive stress of the slurry. By using this method, advantages are obtained such that there is occurred no noise except a noise for drilling, no vibration and less danger. It is considered that quick lime can be used as a demolition agent because of its great expansive stress. It has, however, such a disadvantage that since it has a very high hydration speed and may expand by hydration immediately after being mixed with water, its fluidity is reduced rapidly to become difficult for pouring into the hole. Even though it can be poured, its expansive stress may escape to the direction of a hole opening so that its pressure against the side wall of the hole may become very low. It therefore cannot be used as a demolition agent. In order to overcome this disadvantage, a method may be considered in which a slurry of quick lime is poured into a hole and at the same time a binding cap is fixed on the opening of the hole to restrict its expansive stress, but it is not a preferable method because of its troublesome operation. Another method can also be considered in which silicofluoride and the like added to quick lime to restrict the hydration speed of quick lime. However, it can not be expected to obtain a high expansive stress, since quick lime has no self hydraulic property so that the expansive stress of quick lime may escape to the direction of the opening of the hole. Further, since reactivity of quick lime may be different depending on its burning degree during its preparation, it is very difficult to control its hydration speed.

An object of this invention is to offer a hydraulic demolition agent which hydrate at a relatively low speed and provide large expansive coefficient and expansive stress.

Another object of this invention is to offer a hydraulic demolition agent which can be used at the place of atmospheric temperature higher than 5° C.

Other important objects and advantages features of this invention will be apparent from the following description and the drawings attached.

These objects can be attained in accordance with the present invention.

SUMMARY OF THE INVENTION

We have studied many demolition agents comprising quick lime as a main component, in order to seek out those with large expansive coefficient and expansive stress. As the result, we have now found pulverized clinker which hydrate at a relatively low speed and provide large expansive coefficient and expansive stress. The clinker is obtained by mixing a calcareous material, a siliceous material and gypsum at the molar ratio of $CaO/SiO_2 = 5.0$–$14.4$ and $CaSO_4/SiO_2 = 0.13$–$1.19$, burning the mixture under an oxidizing atmosphere to 1350°–1550° C. to produce a clinker consisting of the following main components: 24–65% by weight of $3CaO.SiO_2$ crystals, 30–60% by weight of CaO crystalline particles and 5–17% by weight of $CaSO_4$, wherein more than 50% by weight of CaO crystalline particles is included in said large $3CaO.SiO_2$ crystals grown.

DETAILED DESCRIPTION OF THE PREFERRED EMBODIMENTS OF THE INVENTION

Figure 1:
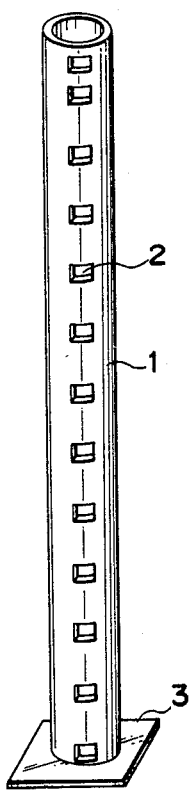

In the case that the amount of $3CaO.SiO_2$ crystals in the clinker is less than 24% in this invention, when the slurry obtained by mixing the pulverized clinker with water is poured into a hole drilled in a brittle material, it will expand by hydration of coexisted CaO crystalline particles and spout from the pouring part similar to the case of quick lime alone, and its expansive stress will become difficult to act as a demolition power. In the case that the amount of $3CaO.SiO_2$ crystals is more than 65%, the amounts of CaO crystalline particles and $CaSO_4$ component are necessarily lowered so that any expansive stress may not be generated. In the case that the amount of CaO crystalline particles is less than 30%, the amount of $3CaO.SiO_2$ crystals becomes too high, so that the above mentioned high expansive stress cannot be obtained. Furthermore, in the case that the amount of CaO crystalline particles is more than 60%, although the expansive stress is high, the amounts of hydraulic components, $3CaO.SiO_2$ and $CaSO_4$ become low, and less than 50% of CaO crystalline particles are included in $3CaO.SiO_2$ crystals. Thus, when a slurry obtained by mixing the pulverized clinker with water is poured into a hole drilled in a brittle material, the slurry may expand and spout from the pouring part, and high expansive stress cannot be obtained. Moreover, in the case that the amount of $CaSO_4$ is less than 5%, a clinker is difficult to be burned, $3CaO.SiO_2$ crystals and CaO crystals cannot grow well, as a result CaO crystalline particles may be included in $3CaO.SiO_2$ crystals insufficiently. Thus, speed of expansion becomes too quick, the expansive stress becomes low, and the generation of expansive stress becomes little. Furthermore, the case that the amount of $CaSO_4$ is more than 17% is not preferable, since a clinker will melt during the burning of it.

A pulverizing degree of the demolition agent is preferable to be 1500–4000 $cm^2/g$ of a specific surface area (Blaine). When the specific surface area is less than 1500 $cm^2/g$, generation of expansive stress is slowly, and when the specific surface area is more than 4000 $cm^2g$, much water is required to obtain a necessary fluidity for pouring into a hole of brittle material, so that expansive stress becomes lower, and therefore it is not preferable as a demolition agent.

Moreover, by adding to the above mentioned demolition agent one or, if compatible, more than one water reducing agents for cement on the free market such as a lignin type, a sulphonate of higher alcohols type, an oxyorganic acid type, an alkylarylsulphonate type and their high condensate type, a polyoxyethylene alkyl ether type, a polyol composite type, a water-soluble melamine resin type, a β-naphthalene sulphonic acid-formalin condensate type or mixing them, an expansive stress of the demolition agent may be improved greatly. When the above mentioned water reducing agent is mixed with the above mentioned demolition agent, powdery or oily one may be mixed during pulverizing step of clinker, or it may be mixed after the pulverization of the clinker. Furthermore, an aqueous solution type one may be mixed with water during the preparing step of the slurry of the above mentioned demolition agent. The amount of the water reducing agent added is about 0.5-2%.

According to this invention, 0.3-0.45 parts of water in the case of not employing a water reducing agent, or 0.25-0.3 parts of water in the case of employing a water reducing agent may be added to 1 part by weight of a demolition agent respectively, and they are mixed to prepare a slurry, and then the slurry is poured into a hole drilled in the brittle material. The appearance of expansive stress is different depending on the composition of the demolition agent and the diameter of hole drilled in the brittle materials. In the cases of the hole diameters being 36, 42 and 52 mm, the expansive stress more than 320, 380 and 400 kg/cm$^2$ respectively can be generated.

The demolition agent of this invention can be used at the place of atmospheric temperature higher than 5° C.

Although it is not clear the reason why the demolition agent of this invention can generate such a high expansive stress, it is considered that since the demolition agent mainly consists of CaO crystalline particles covered by $3CaO.SiO_2$ crystals, $3CaO.SiO_2$ crystals will be hydrated quickly, and then CaO crystalline particles will be hydrated gradually. As the result a strong friction will be occurred between hardened slurry and the wall surface of the hole, and the expansive stress will act almost all against the wall surface of the hole. Furthermore, when a water reducing agent is mixed into a demolition agent, it is considered that the amount of water required to prepare a slurry with a necessary fluidity for pouring may be decreased, and the real amount of the demolition agent in an unit volume of the slurry may be increased, as well as initial hydration of $3CaO.SiO_2$ crystals will be accelerated, and then CaO crystalline particles will expand by hydration, and as a result, the greater expansive stress will be generated.

The measured results of expansive stress generated by the slurry of this invention are described as follows.

The device used for this measurement is one such as shown in FIG. 1. In the FIG. 1, 1 is a carbon steel pipe for ordinary piping arranged vertically with the internal diameter of 36 mm and the length of 120 cm. Two foil strain gages 2 are sticked against each other on the pipe surface at intervals of 10 cm in height of steel pipe 1, wherein each foil consists of two gages with the length of 5 mm which are set in a L-shape, in order that one gage is horizontally and another one is vertically. The bottom of the steel pipe is sealed to steel plate 3 by welding.

Figure 2:
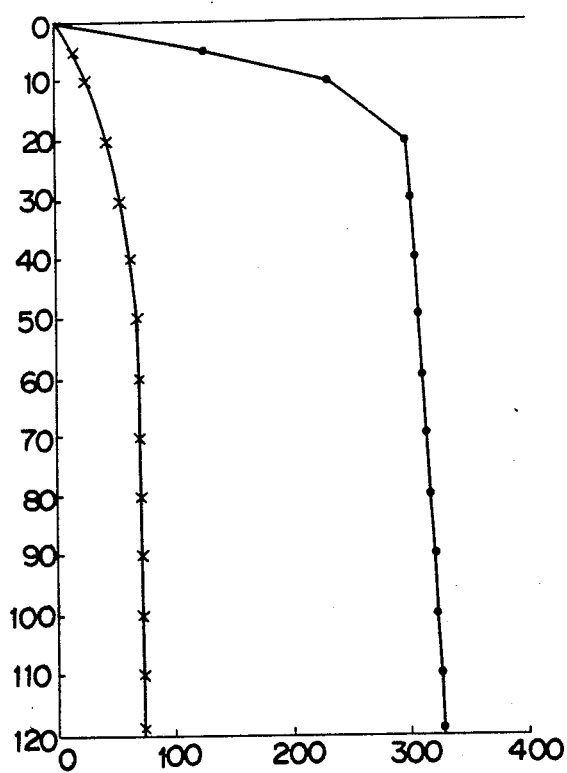
Figure 3:
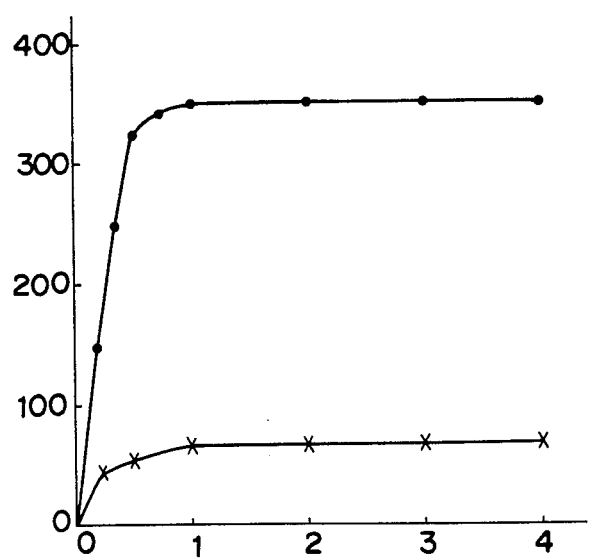

FIG. 2 is a figure showing the relationship between the height (cm) of the expansive stress measuring pipe (longitudinal axis) and the expansive stress (kg/cm$^2$) at one age (lateral axis), in the case that the slurry of the demolition agent is filled in the expansive stress measuring device of FIG. 1. FIG. 3 is a figure showing the relationship of the expansive stress at the middle part of the measuring pipe height (longitudinal axis) and the age of the slurry in the same case as the FIG. 2 (lateral axis).

In FIG. 2 and 3,

.—denotes the demolition agent of this invention,
x—denotes "Denka CSA", cement expansive agent.

In FIG. 2, the longitudinal axis denotes the height (cm) of the measuring pipe and the lateral axis denotes the expansive stress (kg/cm$^2$). In FIG. 3, the longitudinal axis denotes the expansive stress (kg/cm$^2$) and the lateral axis denotes the age (day). Temperature for measuring the expansive stress is 20° C. in every cases.

Figure 4:
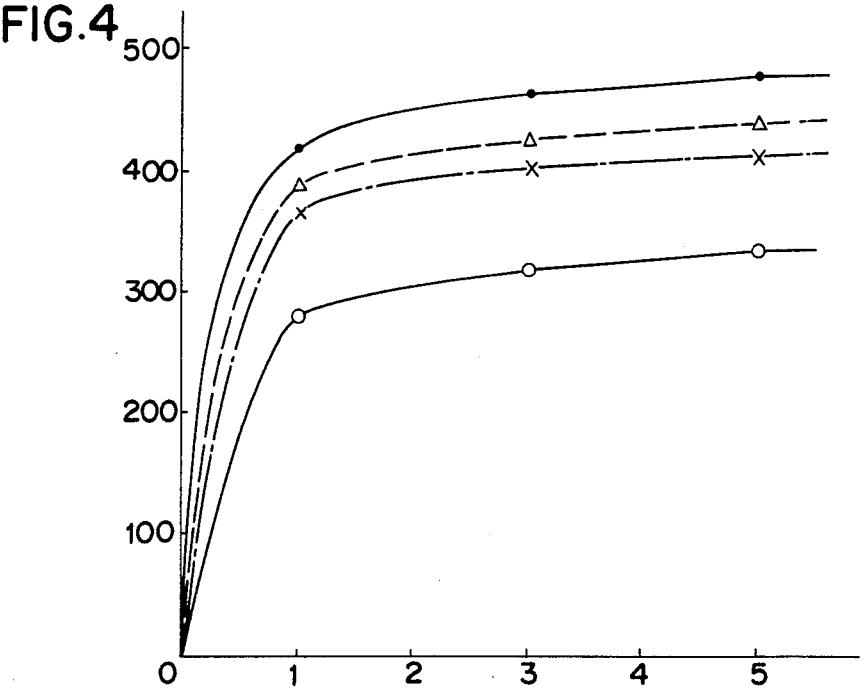
Figure 5:
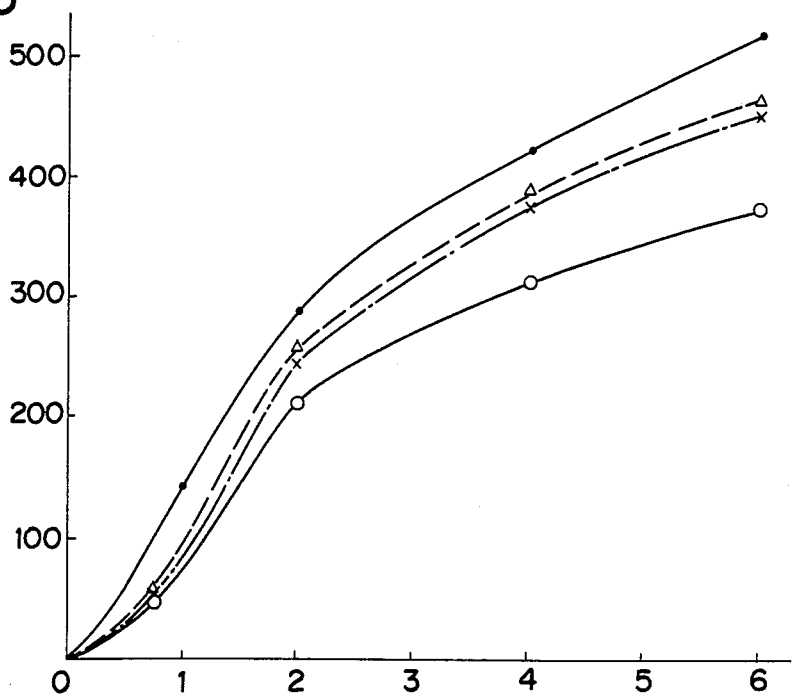

FIG. 4 and FIG. 5 are figures showing the relationship between the age (day) (the lateral axes) and the expansive stress (kg/cm$^2$) (longitudinal axes) at the middle part of the measuring pipe, in the case that various water reducing agents are added to the demolition agent. FIG. 4 is for the case that the room temperature being 20° C. and FIG. 5 is for the case that the room temperature being 5° C.

In FIG. 4 and FIG. 5,

.—denotes the case wherein 1.5% of "Hi-fluid" was added to the demolition agent of this invention; water ratio=30%,
Δ—denotes the case wherein 1% of "Hi-fluid" was added to the demolition agent of this invention; water ratio=33%,
x—denotes the case wherein 1% of "Melment" was added to the demolition agent of this invention; water ratio=35%,
o—denotes the demolition agent of this invention; water ratio=40%.

In FIG. 4 and FIG. 5, the longitudinal axes denote expansive stress (kg/cm$^2$) and lateral axes denote the age (day).

EXPERIMENTAL EXAMPLE 1

A mixture of 84 parts by weight of a calcareous material (CaO 55.3%), 9 parts by weight of a siliceous material (SiO$_2$ 63.0%) and 7 parts by weight of gypsum (SO$_3$ 47.2%) was pulverized to such extent that a residue on a sieve of 88-micron mesh accounted for 1.5%, granulated and then burned at the temperature of 1530° C. A clinker thus obtained consists of the following composition: about 42% of $3CaO.SiO_2$ crystals, about 45% of CaO crystalline particles, about 9% of CaSO$_4$ and about 4% of impurities ($3CaO.Al_2O_3$, $4CaO.Al_2O_3$, $Fe_2O_3$ etc.), wherein about 58% of said CaO crystalline particles was included in large $3CaO.SiO_2$ crystals grown. The clinker was pulverized to the specific surface area of 2200 cm$^2$/g (Blaine), and it was used as a demolition agent. A slurry prepared by adding 0.35 parts by weight of water to 1 part of said demolition agent and mixing them, was filled into a steel pipe shown in FIG. 1 and hydrated at room temperature. Its expansive stress was measured to obtain the results shown in FIG. 2 (the relationship of the expansive stress at the one day) and in FIG. 3 (the changes of expansive stress depending on the age at the middle part of the pipe). For comparison, in FIG. 2 and FIG. 3, the results which were obtained by using a "Denka CSA", cement expansive agent made from Denki Kagaku Kogyo Kabushiki Kaisha in place of the above mentioned demolition and hydrating it under the same conditions as those described above, were also shown together.

EXPERIMENTAL EXAMPLE 2

A mixture of 85 parts by weight of a calcareous material (CaO 55.3%), 7 parts by weight of a siliceous material (SiO$_2$ 63.0%) and 8 parts by weight of gypsum (SO$_3$ 47.2%) was burned at the temperature of 1530° C. at the same conditions as the Experimental Example 1. A clinker thus obtained consists of the following composition: about 35% of $3CaO.SiO_2$ crystals, about 50% of CaO crystalline particles, about 10% of $CaSO_4$ and about 5% of impurities ($3CaO.Al_2O_3$, $4CaO.Al_2O_3$, $Fe_2O_3$ etc.), wherein about 63% of said CaO crystalline particles with particle diameter distribution of 5–30 micron is included in large $3CaO.SiO_2$ crystals grown. The clinker was pulverized to the specific surface area of 3340 cm$^2$/g (Blaine), and it was used as a demolition agent with or without "Hi-fluid" (made from Takemoto Oil and Fat Company Limited; its main component being high condensate type of alkylarylsulphonate) or "Melment" (made from Showa Denko Kabushiki Kaisha; its main component being water soluble melamine resin type) as a water reducing agent. Slurry prepared by mixing 1 part by weight of a demolition agent with varied amounts of water, were filled into the same steel pipe as one used in Experimental Example 1. They were then hydrated at 20° C. and 5° C. to obtain the changes of the expansive stress at the middle part of the pipe, which were shown in FIG. 4 and FIG. 5.

From the above mentioned tests, the demolition agents according to the invention were found to generate high expansive stress. Therefore, by using the demolition agent according to the invention, it is possible to break easily rocks and concrete having high fracture strength.

Finally, this invention is explained by the following examples.

EXAMPLE 1

A hole with diameter of 3.5 cm and depth of 60 cm were drilled at the middle part of 1 m$^3$ of non-reinforced concrete block having the following mechanical properties: 300 kg/cm$^2$ of compressive strength, 28 kg/cm$^2$ of tensile strength and $2.7 \times 10^5$ kg/cm$^2$ of Young's modulus. A slurry obtained by mixing 1 part by weight of the demolition agent used in Experimental Example 1 and 0.35 parts by weight of water, was filled in the hole, allowed to stand at the atmospheric temperature of 21° C. Then three cracks were occurred from the position of the hole after 6 hours, and the concrete was split into three small blocks after 20 hours.

EXAMPLE 2

Four filling holes with diameter of 3.5 cm and depth of 100 cm were drilled at intervals of 70 cm in 1.8 m × 2.0 m × 1.5 m of limestone boulder. The demolition agent was a mixture of the specific surface area of 3480 cm$^2$/g (Blain) of the clinker used in Experimental Example 2 and 1% by weight of "Melment" powders. Slurry obtained by mixing 1 part by weight of the demolition agent and 0.35 parts by weight of water, was filled into the holes and allowed to stand at the atmospheric temperature of 15° C. After 30 hours, cracks were occurred and after 4 days it was split into seven small blocks.

What we claim is:

1. In a method for demolition which breaks brittle materials by means of the expansive stress generated by the hydration of a demolition agent, the improvement comprising pouring into a hole drilled in the brittle material an aqueous slurry of a demolition agent of pulverized clinker consisting essentially of 24–65% by weight of $3CaO.SiO_2$ crystals, 30–60% by weight of CaO crystalline particles and 5–17% by weight of $CaSO_4$, wherein more than 50% by weight of said CaO crystalline particles are included in said $3CaO.SiO_2$ crystals.

2. The method of claim 1, wherein the chemical composition of the clinker consists of 35–42% by weight of $3CaO.SiO_2$ crystals, 45–50% by weight of CaO crystalline particles and 9–10% by weight of $CaSO_4$, wherein 58–63% by weight of said CaO crystalline particles are included in said $3CaO.SiO_2$ crystals.

3. The method of claim 1 or 2, wherein the pulverizing degree of the clinker is 1500–4000 cm$^2$/g of specific surface area (Blaine).

4. The method of claim 1 or 2, wherein a water reducing agent is mixed in an amount of 0.5–2% by weight with said demolition agent.

5. The method of claim 4, wherein the water reducing agent comprises a composition selected from the group consisting of a lignin, a sulphonate of higher alcohols, an oxyorganic acid, an alkylarylsulphonate and their high condensates, a polyoxyethylene alkylether, a polyol composite type, a water soluble melamine resin, a β-naphthalene sulphonic acid-formalin condensate and their mixtures.

6. The method of claim 5, wherein the water reducing agent is an alkylarylsulphonate or a water soluble melamine resin.

* * * * *